United States Patent
Kumar et al.

(10) Patent No.: US 10,623,946 B1
(45) Date of Patent: Apr. 14, 2020

(54) MULTI-SIM ASSISTANCE INFORMATION

(71) Applicant: QUALCOMM Incorporated, San Diego, CA (US)

(72) Inventors: Akash Kumar, Hyderabad (IN); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/380,821

(22) Filed: Apr. 10, 2019

(30) Foreign Application Priority Data

Mar. 25, 2019 (IN) .............................. 201941011455

(51) Int. Cl.
*H04W 8/00* (2009.01)
*H04W 8/20* (2009.01)
*H04W 76/28* (2018.01)
*H04W 8/18* (2009.01)
*H04W 84/04* (2009.01)

(52) U.S. Cl.
CPC ........... *H04W 8/205* (2013.01); *H04W 8/183* (2013.01); *H04W 76/28* (2018.02); *H04W 84/042* (2013.01)

(58) Field of Classification Search
CPC ..... H04W 8/205; H04W 8/183; H04W 76/28; H04W 84/042
See application file for complete search history.

(56) References Cited

U.S. PATENT DOCUMENTS

| | | | |
|---|---|---|---|
| 8,634,845 B2 * | 1/2014 | Frost | H04W 60/02 455/456.1 |
| 2013/0143560 A1 * | 6/2013 | Nenner | H04W 8/183 455/435.1 |
| 2014/0023016 A1 * | 1/2014 | Mildh | H04L 5/001 370/329 |
| 2016/0262200 A1 * | 9/2016 | Su | H04W 52/0209 |
| 2017/0034840 A1 * | 2/2017 | Mandil | H04W 24/10 |
| 2018/0070327 A1 * | 3/2018 | Qureshi | H04W 74/006 |
| 2018/0227904 A1 * | 8/2018 | Raghunathan | H04W 8/22 |
| 2019/0141551 A1 * | 5/2019 | Berlin | H04W 24/08 |

FOREIGN PATENT DOCUMENTS

CA 3047858 A1 * 8/2018 ............ H04W 8/183

* cited by examiner

*Primary Examiner* — Khai M Nguyen
(74) *Attorney, Agent, or Firm* — Nerrie M. Zohn

(57) ABSTRACT

A MSIM capable UE may operate in a connected mode on a first subscription with a first network and operates on a second subscription in an idle mode or an active mode. The UE may miss communication on the first subscription by tuning away for activity on the second subscription. As presented herein, the may UE transmit, to the first network, MSIM assistance information regarding the second subscription. The MSIM assistance information may enable the network to determine periodic gaps needed by the UE to monitor a second subscription in an idle mode. The MSIM assistance information may enable the network to identify a network for the second subscription and to obtain scheduling information directly from that network.

30 Claims, 13 Drawing Sheets

MULTI-SIM ASSISTANCE INFORMATION

CROSS REFERENCE TO RELATED APPLICATION(S)

This application claims the benefit of Indian Patent Application No. 201941011455 entitled "MULTI-SIM ASSISTANCE INFORMATION" and filed on Mar. 25, 2019, which is expressly incorporated by reference herein in its entirety.

BACKGROUND

Technical Field

The present disclosure relates generally to communication systems, and more particularly, to wireless communication involving multiple subscriber identity modules.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A Multiple Subscriber Identify Module (MSIM) capable User Equipment (UE) may operate in a connected mode on a first subscription with a first network while operating in an idle mode or an active mode on a second subscription. The UE may miss communication on a subscription by tuning away for activity on the second subscription. Additionally, MSIM activity may cause self-interference. As presented herein, the may UE transmit, to the first network for a first subscription, MSIM assistance information regarding the second subscription. The MSIM assistance information may enable the network to determine periodic gaps needed by the UE to monitor a second subscription in an idle mode. The MSIM assistance information may enable the network to identify a network for the second subscription and to obtain scheduling information directly from that network. Therefore, the MSIM assistance information may enable the first network to more effectively schedule the UE whether based on information that is received directly from the UE or by obtaining scheduling information for the second subscription from a network, e.g., via an X2 interface.

In an aspect of the disclosure, a method, a computer-readable medium, and an apparatus are provided. The apparatus operates in a connected mode on a first subscription with a first network and operates in a second mode on a second subscription for a second network. The apparatus then transmits, to the first network, MSIM assistance information regarding the second subscription.

In another aspect of the disclosure, a method, a computer-readable medium, and an apparatus are provided. The apparatus receives, from a UE operating in a connected mode based on a first subscription with a first network, MSIM assistance information regarding operation in a second mode for a second subscription. The apparatus then schedules the UE based on the MSIM assistance information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
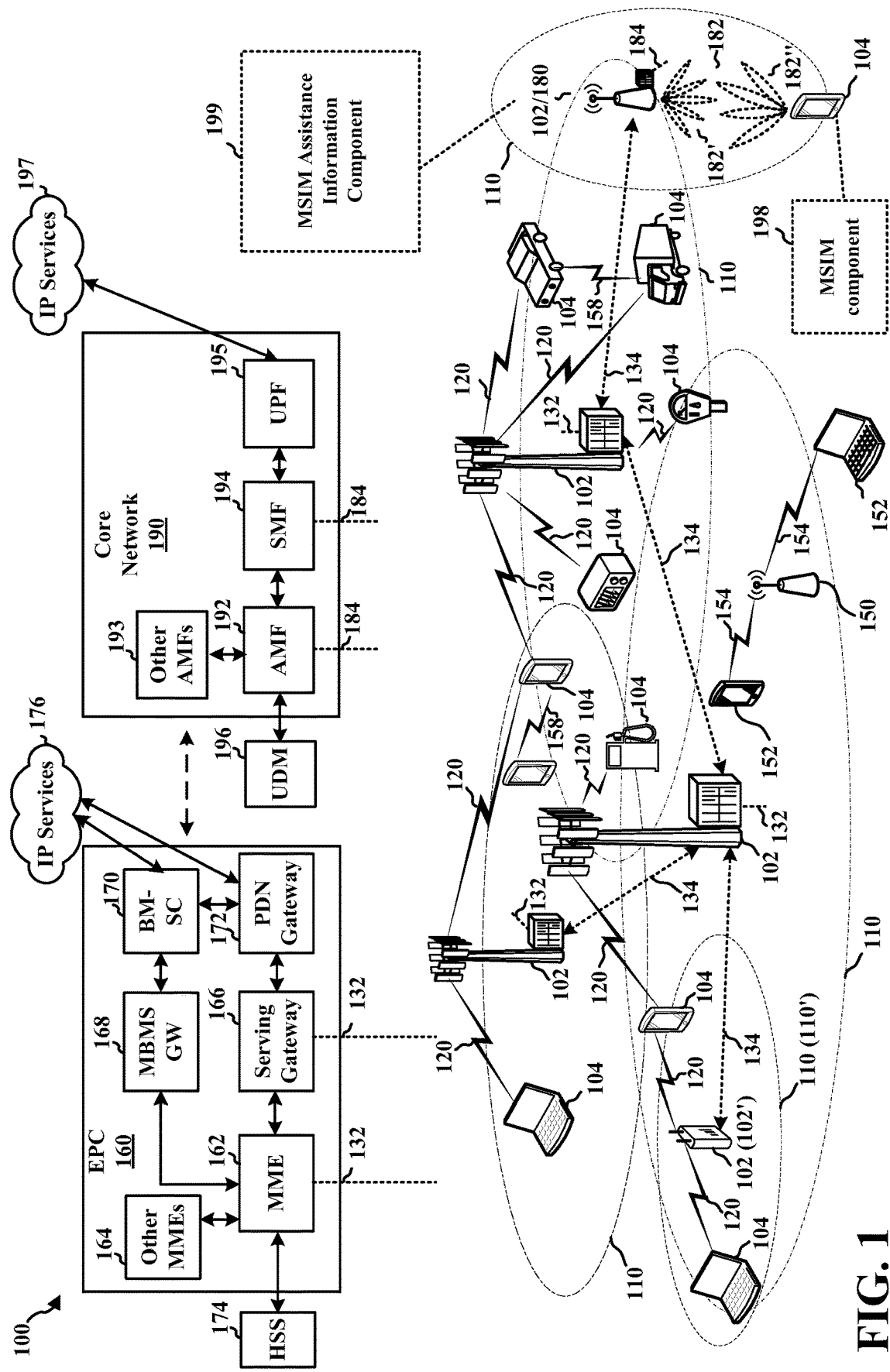
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to operate in a connected mode on a first subscription with a first network and operate in a second mode on a second subscription for a second network. The UE 104 may comprise an MSIM component 198 configured to transmit, to the first network, e.g., base station 102/180, MSIM assistance information regarding the second subscription.

In another example, base station 102/180 may include a MSIM assistance information component 199 configured to receive, from a UE operating in a connected mode based on a first subscription with a first network, MSIM assistance information regarding operation in a second mode for a second subscription. The apparatus then schedules the UE based on the MSIM assistance information. Although the examples presented herein may be focused on 5G NR, the concepts described herein may be applicable to other similar areas, such as LTE, LTE-A, CDMA, GSM, and other wireless technologies.

Figure 2:
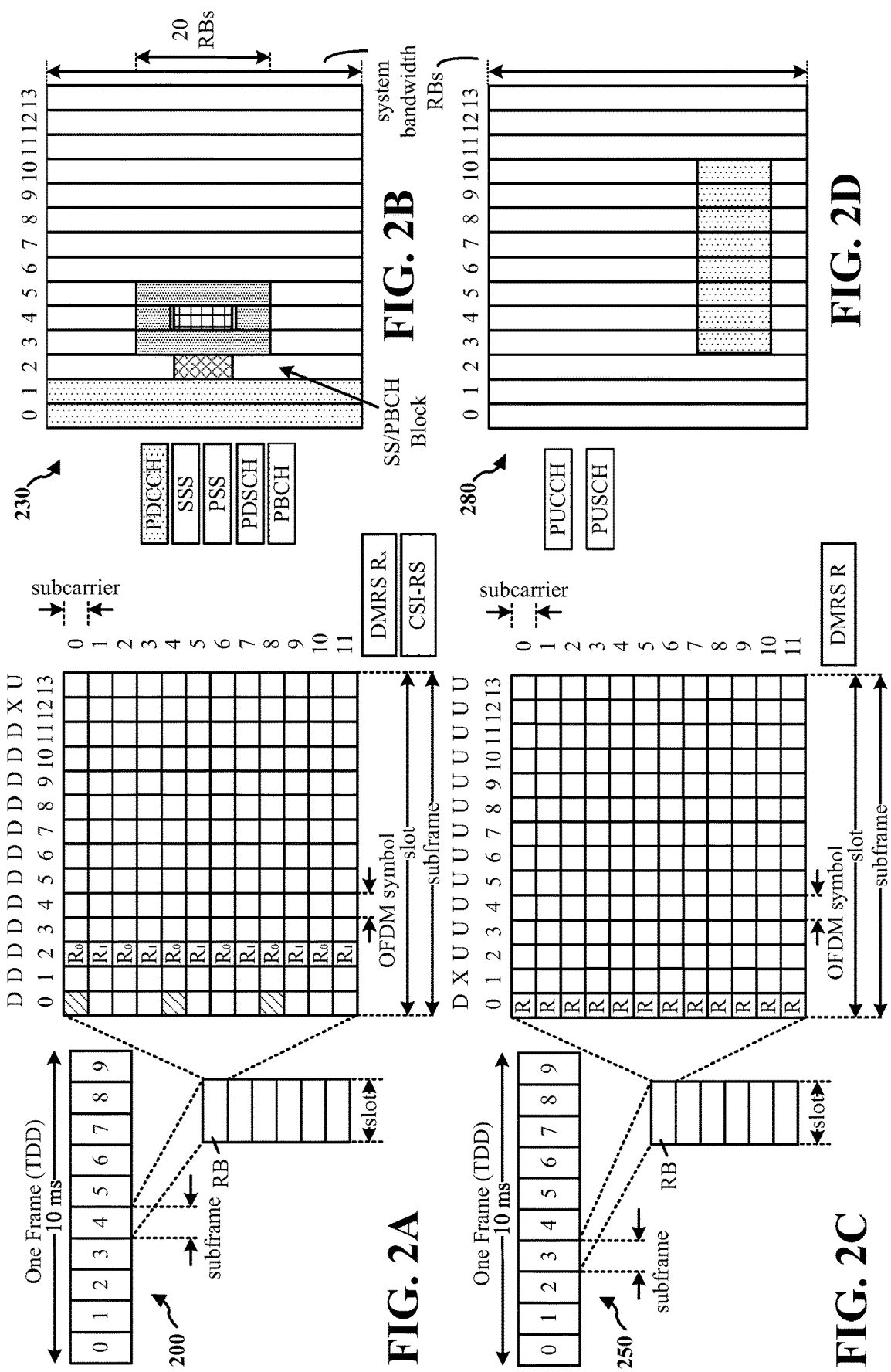
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 ρs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
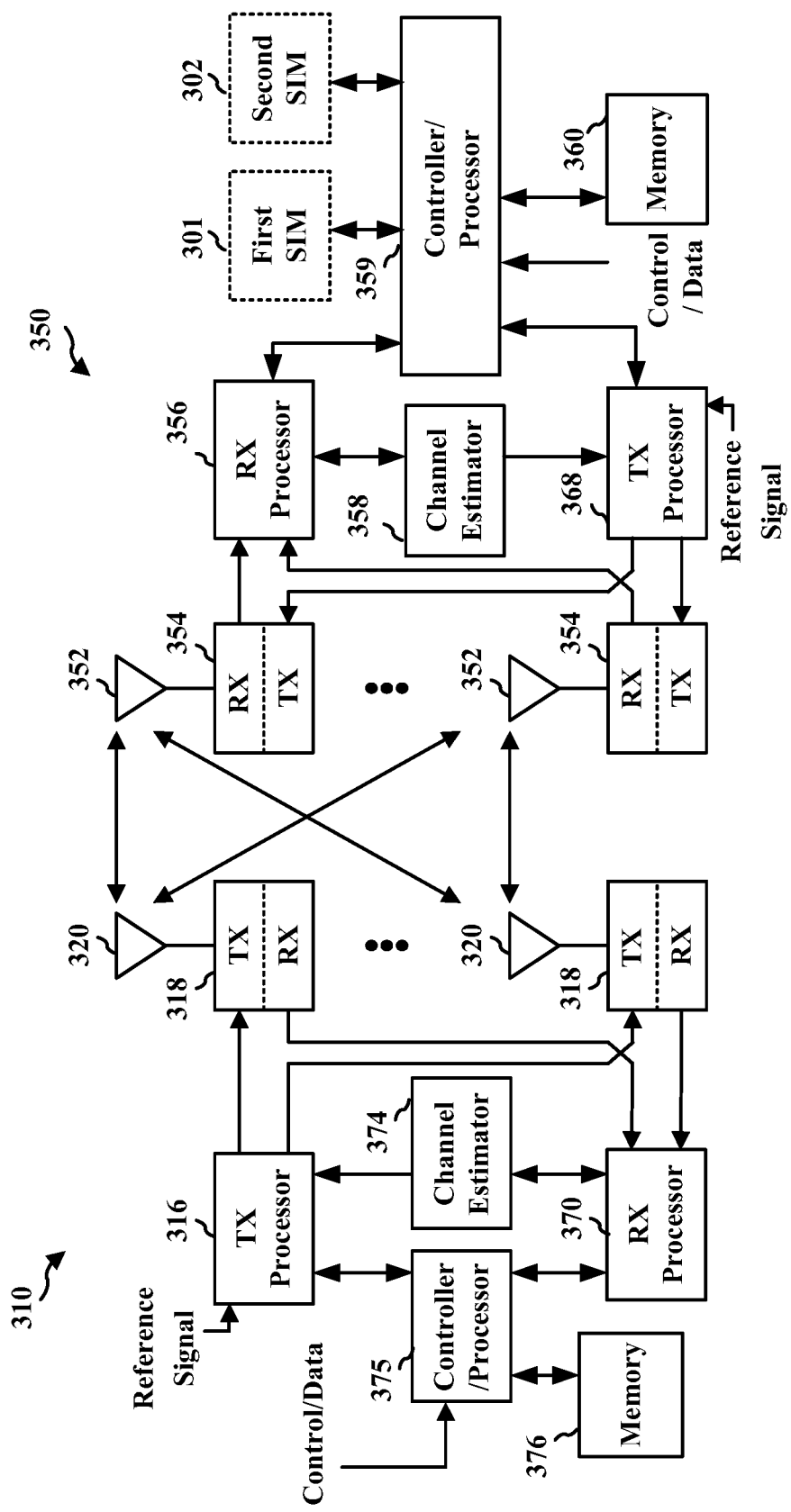
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Devices may have Multiple Subscriber Identity Module (MSIM) capability. FIG. 3, for example illustrates a UE having multiple SIMs (e.g., a first SIM 301 and a second SIM 302). Although two SIMs are illustrated, aspects described herein may be similarly applied to a device comprising more than two SIMs. Having multiple SIMs may enable a single device to use different numbers for voice calls. Multiple SIMs may enable the device to operate using more than one network.

MSIM devices may have challenges communicating using the multiple subscriptions because a network for one subscription, e.g., based on a first SIM, is only aware of the corresponding subscription at the UE. The network is unaware of the UE's support for multiple subscriptions as well as being unaware of network information about such subscriptions.

As one example of MSIM operation, a UE may operate using Dual Sim Dual Standby (DSDS), in which the UE may use one subscription to actively communicate, e.g., transmit and/or receive data or voice calls while the other SIM remains on standby. The other subscription may be in an idle mode, and the UE may monitor for pages on the other subscription based on a DRX cycle.

Figure 4:
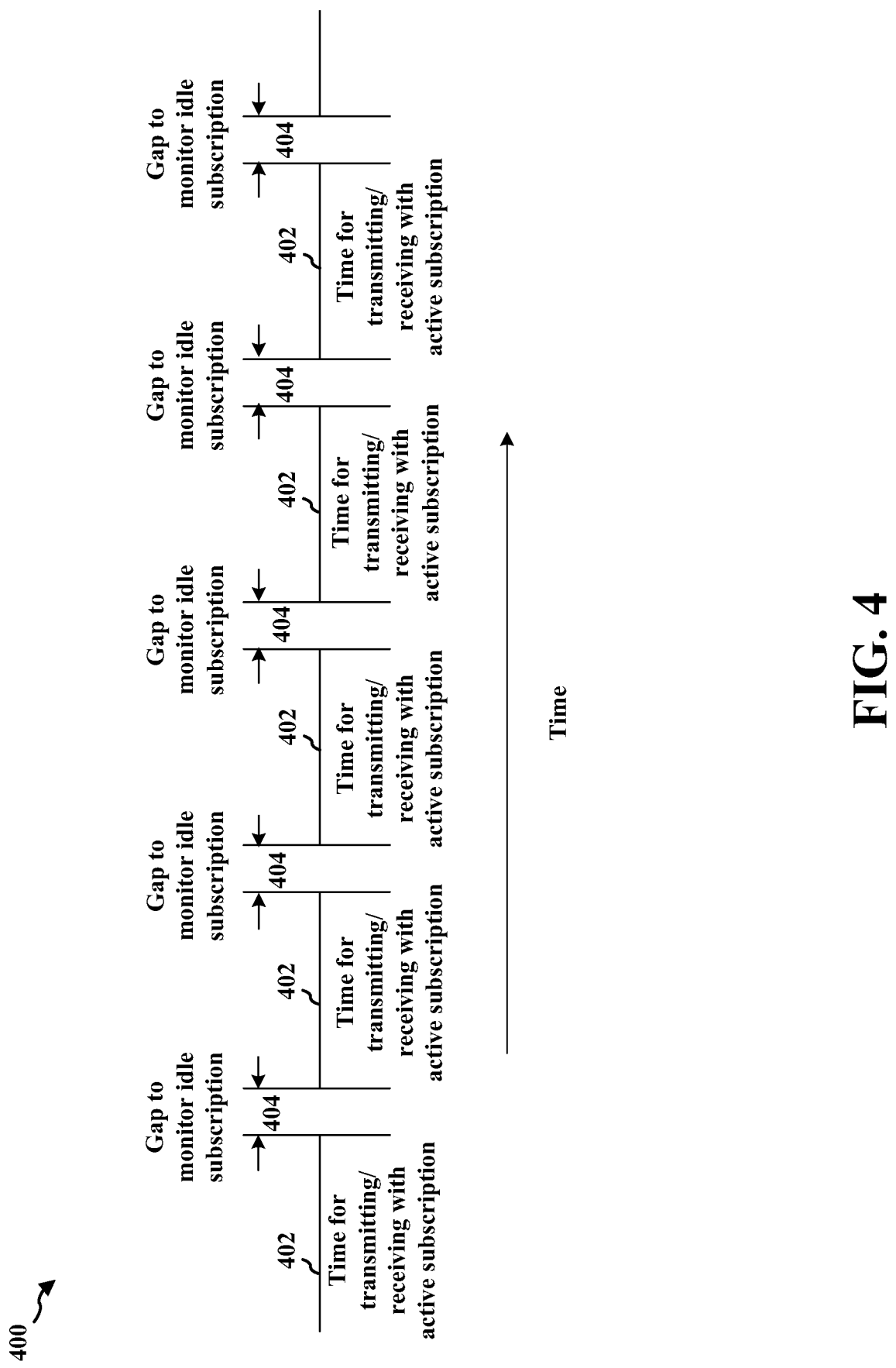
FIG. 4 illustrates an example of timing for use with multiple subscriptions.

DSDS devices may experience throughput degradation, e.g., when compared to a Single SIM (SSIM) mode of operation. Such degradation may occur when the UE initiates periodic gaps in communication on the active subscription in order to monitor for a page on the idle subscription and to perform idle mode searches. Thus, the UE may tune away from the frequency band of the first, active subscription to monitor for communication on a frequency band of the second, idle subscription. FIG. 4 illustrates an example 400 of time resources used by a UE for DSDS communication. During time periods 402, the UE may actively communicate, e.g., transmit and/or receive communication with a network based on the active subscription. FIG. 4 also shows periodic gaps 404 during which the UE monitors for communication, e.g., pages, etc., based on an idle subscription. As the UE autonomously performs the tuning away from the active subscription, e.g., without negotiating such operation with the network of the first subscription and without relying on resources allocated for such tuning away from the frequency band of the first subscription, the network of the first subscription may continue to schedule the UE during times that the UE plans to give up radio resources to the idle subscription. Thus, the UE may fail to receive communication on the active subscription during gap periods 404. For example, the UE may puncture a data transmission being received on the active subscription in order to monitor for a page on the idle subscription during gap 404.

DSDS can result in multiple issues at the UE. In addition to experiencing throughput degradation due to missed communication on the active subscription while monitoring for communication using idle subscription, the missed communication may cause the network to determine that the UE is in poor coverage. In response, the network may reduce resources granted to the UE following a gap 404. Such a reduction in resources following the gap 404 could compound the communication issues at the UE, by further reducing the resources that the UE can use for the active subscription. As another example, the network may provide signaling during the gap 404 that the UE requires in order to receive communication following the gap. Such signaling may include, for example, a Bandwidth part switch instruction, a timing advance command, and/or other control signaling. By missing such signaling, while monitoring for a page using the inactive subscription, the UE may be unable to receive and decode the communication in period 402 following the gap 404 because the UE did not receive the signaling.

A UE may attempt to work around the challenges of DSDS operation, e.g., by employing a Power Headroom Report (PHR) boost to minimize the adverse impact. A power headroom report is sent by the UE to a base station indicating how much power a UE has remaining to transmit beyond the transmission power that the UE is currently using for uplink transmission. The UE may provide a boosted PHR indicating a higher power headroom than the actual power headroom of the UE. A boosted PHR may indicate to the base station a larger amount of available transmission power than actually experienced by the UE. The boosted PHR may improve communication in the period 402 following a gap 404. However, this may require a UE to determine an amount of increase to apply to the PHR. As another potential work around, a UE may send a HARQ NACK prior to the gap in order to receive a repetition following the gap. However, it may be difficult to apply such actions to multiple networks. As well, the UE may need to determine how early to begin sending the NACK before the gap, etc. A boosted PHR and/or early NACK may also cause network issues at a network scheduler. If many UEs report a higher PHR than actually experienced or send NACKs in order to cause repetitions that are caused by tuning away rather than actual signaling problems, an increased transmission power due to the PHR and/or added transmissions due to the NACK may burden the network. There may be challenges in determining how to use a timing advance, obtaining a timing advance when an abnormal timing advance occurs after the gap, etc.

Figure 6:
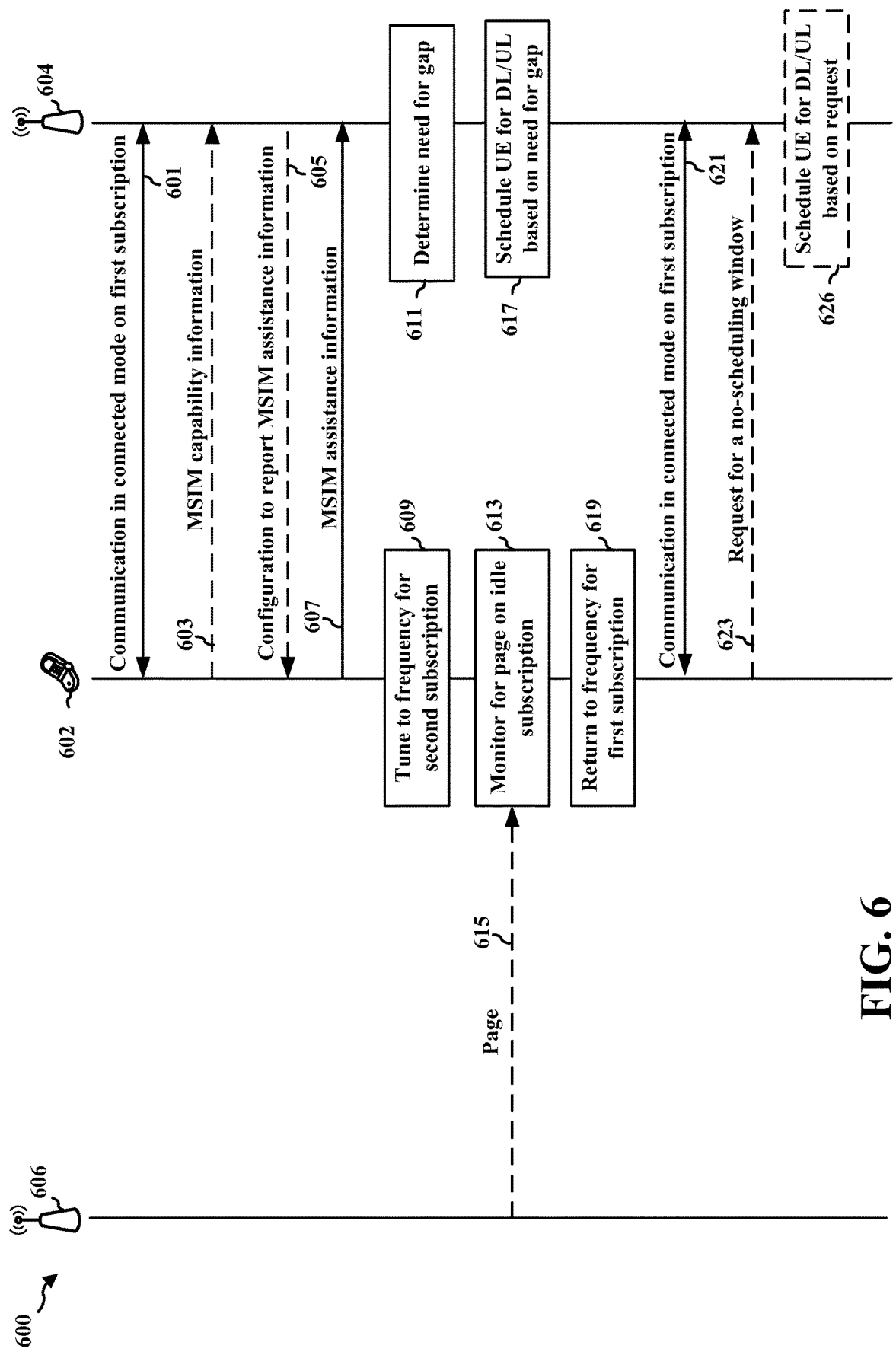
FIG. 6 illustrates an example communication flow between a UE and a base station.

Aspects presented herein provide potential solutions to the challenges for MSIM operation by providing MSIM information to a network based on an active subscription. FIG. 6 illustrates an example communication flow 600 between a UE 602 and base stations 604, 606 including the provision of MSIM assistance information 607 from a UE to a base station. As illustrated at 601, the UE 602 and base station 604 may communicate based on a first subscription of the UE. Communication 601 may include the transmission and/or reception of communication by UE 602.

The UE may provide MSIM capability information and/or MSIM status information 603 to inform the network of the UE's MSIM capability or the UE's MSIM status. MSIM capability information may be sent in RRC signaling, such as a UE capability information message. The UE may also provide the base station with MSIM assistance information 607 regarding the other subscription. By providing a network with such MSIM assistance information, the network may adjust communication with the UE based on the MSIM assistance information to improve communication with the UE with knowledge that the UE may be experiencing periodic gaps 404 during which it will not receive/transmit communication with the network. Furthermore, such assistance information may enable the network to more efficiently use wireless resources during the gap periods. Rather than transmitting data to the UE during the gap period 404 that will be missed by the UE and will need to be repeated, the network may use the wireless resources during gap period 404 for other purposes.

As one example, the UE may provide MSIM assistance information 607 based on a received configuration from the base station 604 to send MSIM assistance reports. If the UE receives an indication from the base station to send MSIM assistance report information, e.g., as illustrated at 605, the UE may provide the MSIM assistance information. Otherwise, the UE may consider itself not to be configured to send MSIM assistance reports.

The MSIM assistance information may be provided by the UE in a UE assistance information message, e.g., as a part of RRC signaling between the UE 602 and base station 604.

Figure 5:
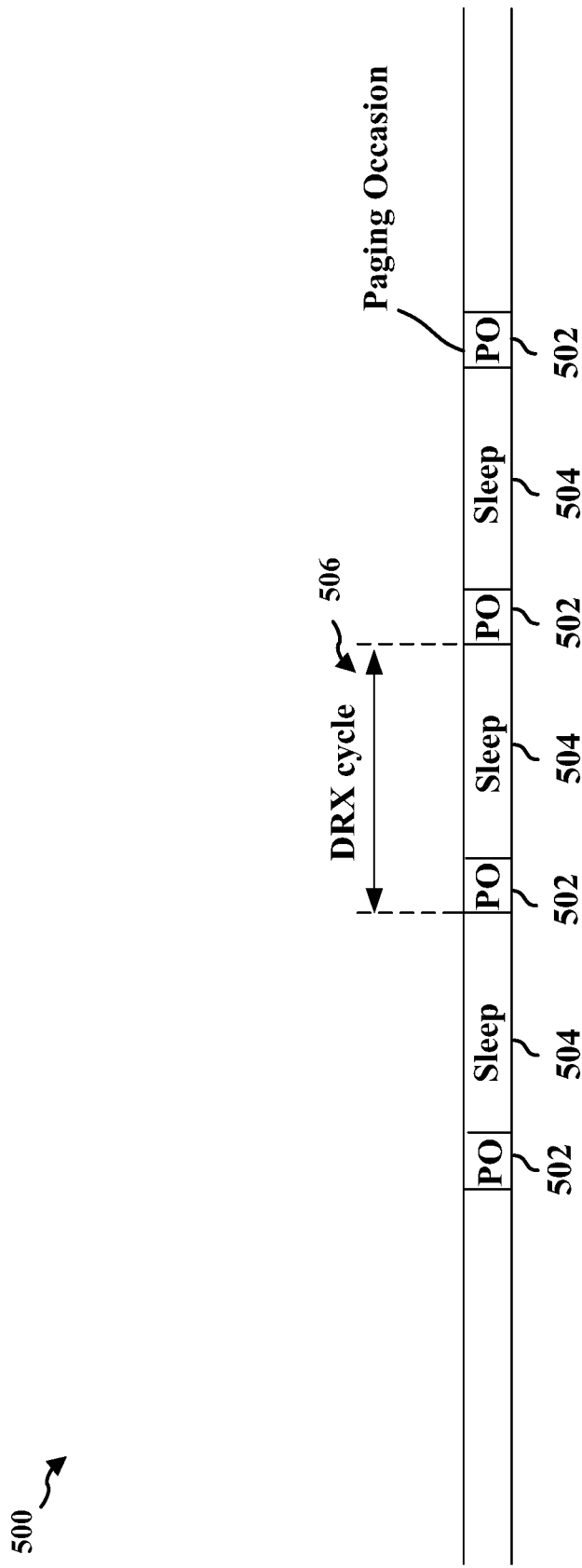
FIG. 5 illustrates example aspects of a Discontinuous Reception (DRX) cycle.

FIG. 5 illustrates an example structure 500 of a DRX cycle 506. A DRX cycle may include a Paging Occasion (PO) 502 followed by a sleep portion 504 during which the UE enters a sleep mode, or reduced power mode in which the UE reduces power consumption by shutting down a radio frequency (RF) function without detecting communication from the base station. At the end of the DRX cycle, the UE may wake up for the next PO. A UE in DSDS may operate in a connected mode, e.g., actively transmitting/receiving communication on a first subscription while also operating in an idle mode on a second subscription. Thus, the UE may monitor for pages on the second, idle subscription according to a DRX cycle. For example, gaps 404 in FIG. 4 may be used to tune away from a frequency band for the first, active subscription, as illustrated at 609, to monitor for a page 615 during a PO 502 for the second subscription, as illustrated at 613. During the sleep portion 502 of the DRX cycle for the second subscription, the UE may return to communication on the frequency band for the first, active subscription at 619, e.g., at a timing corresponding to 402. Thus, gap 404 in FIG. 4 may correspond to the time needed to monitor for a page during PO 502 on a second, idle subscription in FIG. 5. Similarly, sleep portion 504 of the DRX cycle may correspond to the time period 402 in FIG. 4 that is used for communication on a first, active subscription. The tune away duration may begin at the time for the UE tunes to the frequency for the second subscription, at 609, and may last until the UE returns to the frequency for the first subscription, at 619.

The MSIM assistance information 607 may assist the network in communicating with the UE. The UE may provide the MSIM assistance information to the network associated with the connected mode subscription. For example, the MSIM assistance information may indicate to the network the UE's MSIM capabilities and/or an MSIM mode of operation of the UE. The MSIM assistance information may enable the network to determine aspects of an upcoming paging occasion for the UE on another subscription.

As an example, the UE may provide MSIM assistance information 607 about a metric of an upcoming paging occasion on the idle subscription. The information may indicate a timing during which the UE will monitor for a page on the idle subscription and/or a location at which the UE will monitor for the page on the idle subscription.

As another example, the UE may indicate MSIM assistance information 607 about a DRX cycle for the idle subscription, e.g., including any information about DRX cycle 506, PO 502, and/or sleep duration 504.

As another example, the UE may indicate MSIM assistance information 607 about a tune away duration that the UE needs to monitor for the page on the idle subscription. The tune away duration may be based on the particular combination of frequency bands for the first subscription and the second subscription. For example, the UE may require a shorter tune away duration if the frequency band for the active subscription is closer to the frequency band for the idle subscription and may require a longer tune away duration if the frequency band of the active subscription has a frequency than is farther from the frequency of the idle subscription. Thus, the tune away duration may inform the network for the active subscription about the actual amount of time that the UE will tune away from the frequency band of the network to monitor for a page on a frequency band for the idle subscription.

As another example, the UE may provide MSIM assistance information 607 with identifying information about the second subscription. For example, the UE may indicate PLMN information for the second subscription. By providing the PLMN information of the other subscription, the network associated with the first subscription may determine whether the PLMN of the first subscription is the same and the PLMN of the second subscription and/or whether there is an agreement with the PLMN of the second subscription. For example, the network of the first subscription may apply certain adjustments to scheduling the UE based on whether the other subscription is for the same PLMN or a different PLMN having an agreement with the PLMN of the first subscription.

As illustrated at 611, the network may use any combination of such MSIM assistance information 607 to determine a UE's need for periodic gaps, e.g., 404, in order to monitor for and/or decode pages 615 on an idle subscription. At 617, the network communicating in the connected mode with the UE may then schedule the UE for downlink communication and/or provide the UE with uplink grants that avoid the time period during the gaps 404. Additionally or alternatively, the network receiving the MSIM assistance information may use the information to ensure that critical signaling is not transmitted to the UE during the periodic gaps 404. For example, the network may avoid sending the UE signaling about a bandwidth part (BWP) switch during a gap 404 and may wait to send such signaling until time period 402. As another example, the network may avoid sending the UE a Timing Advance (TA) command during a gap 404 and may wait to send such signaling until one of time periods 402. In another example, the network may use the MSIM assistance information in order to ensure that RRC reconfiguration information or other control signaling is not transmitted to the UE during the gap 404 when the UE will not receive the information on the first subscription. Thus, communication 621 following receipt of the MSIM assistance information 607 may be scheduled taking the UE's need for gaps in communication to monitor for a page on the idle subscription, at 613.

In another example, a UE may be operating in a carrier aggregation mode for the active subscription, e.g., for data. The UE may request a break in scheduling, at 623, on a particular carrier for the active subscription based on the radio resources that the UE plans to use to monitor for the idle subscription. The request may indicate a particular carrier using a carrier ID. Although illustrated as a separate message, the request for a break in scheduling may be comprised in MSIM assistance information. The network may respond by refraining from scheduling the UE during a window in time on the indicated carrier, e.g., at 626. The request for a scheduling break 623 may lead a base station of the connected mode subscription to refrain from scheduling the UE on the indicated carrier during the indicated time, e.g., while continuing with normal network scheduling on the other carriers.

Additionally, or alternatively, to sending MSIM assistance information 607 in a UE assistance message, the UE may provide information to the network about a different subscription using MAC signaling. For example, a UE may indicate a need for a gap and/or periodic gaps in communication with the network using a MAC CE, e.g., either at 607 or at 623. The gaps may correspond to gaps 404 in FIG. 4 and may be based on the DRX cycle of the other subscription. There may be examples in which a UE may need longer gaps in an aperiodic manner. For example, a UE may require a longer gap for activities on the other subscription such as to perform an Out of Service (OOS) recovery operation on the other subscription. Thus, the UE may indicate the need for multiple gaps or for a single gap in communication from one subscription in order to perform an activity on another subscription. The MAC CE may comprise a CE that is dedicated for the UE to send a "no scheduling" request on a current subscription in order to obtain a suitable gap in time to use the radio resources for an activity on a different subscription. The other activity may comprise any of monitoring for a page, receiving communication, transmitting communication, performing OOS recovery, etc. Once the need for the gap(s) is over, the UE may send another MAC CE deactivating the request, e.g., deactivating the MSIM assistance information provided via the MAC CE.

Prior to sending the MAC CE requesting a gap in scheduling, the UE may first indicate MSIM capability to the network, e.g., as illustrated at 603. For example, the UE may indicate a dual standby capability in a UE capability message as a pre-requisite for sending the MAC CE requesting a scheduling gap for one subscription in order to monitor for a page or perform another activity on the other subscription.

In another example, the UE may indicate, at 607 or 623, a fixed length of the requested gap(s) in scheduling for the connected subscription in a MAC CE (e.g., a MAC CE MSIM Assistance). The UE may send an activate command to request an integer number of ms (e.g., x ms) without scheduling from the current subscription. At times a fixed length of periodic gaps might not be sufficient, e.g., if the other subscription goes out of service. Thus, the UE may need a way to request a longer gap at times.

Upon receiving the MAC CE from the UE, a base station may observe the scheduling window of x ms by refraining from scheduling the UE for downlink and/or uplink communication during the x ms, e.g., at 626. Upon expiration of x ms, the base station may return to normal scheduling for the UE. The network may adjust its behavior based on PLMN information shared by the UE for the other subscription. Thus, the base station may observe the scheduling window if the other subscription is for the same PLMN as the current subscription or is for a PLMN that is a partner of the PLMN of the current subscription. If the other subscription corresponds to a PLMN that is not a partner of the PLMN of the current subscription, the base station may schedule the UE normally without taking the scheduling window into account.

Another mode of operation involving multiple SIMS is a Dual Sim Dual Active (DSDA) mode. In DSDA, both SIMs may be active simultaneously. For example, the UE may use both subscriptions to receive calls or data, transmit communication, etc. DSDA may involve the use of two transceivers, whereas DSDS may enable to use of multiple SIMs in a device using a shared transceiver. The UE may include an a modem that supports voice on one subscription and data transmission/reception on the other subscription. In another example, the modem may support data transmission/reception on one subscription and data transmission/reception on the other subscription.

In DSDA mode, transmissions from one subscription may interfere with reception of the other subscription. For example, the transmission from the first subscription may de-sense or cause self jamming to the receiver of the other subscription. Such interference can cause Signal-to-Noise Ratio (SNR) degradation and/or data throughput degradation for the receiver. An transmission on the first subscription can even lead to a radio link failure for the second subscription, e.g., based on the sensitivity level of the radio link for the second subscription. For example, if the radio link for the second subscription is near a level for a radio link failure, the transmission from the first subscription may cause the radio link to experience a radio link failure.

A UE may use a transmission power back off for the first subscription in an attempt to reduce the impact on reception at the second subscription. However, reducing the transmission power of the first subscription may cause additional problems. For example, if the UE is near a cell edge for the first subscription, a reduction in transmission power may lead to a radio link failure for the first subscription. A UE may be supplied with a non-linear interference cancellation component or other hardware component to address the interference between the two subscriptions. However, the addition of hardware components to the UE adds cost and complexity to the device.

In order to improve active communication using multiple subscriptions, the UE may provide, to a network for one subscription, MSIM assistance information that includes information regarding the other subscription. The information may enable the network to identify a cell or a network associated with the other subscription. Such identifying information may be sent to the network in addition to or alternately to the examples of MSIM information described in connection with FIG. 6.

Figure 7:
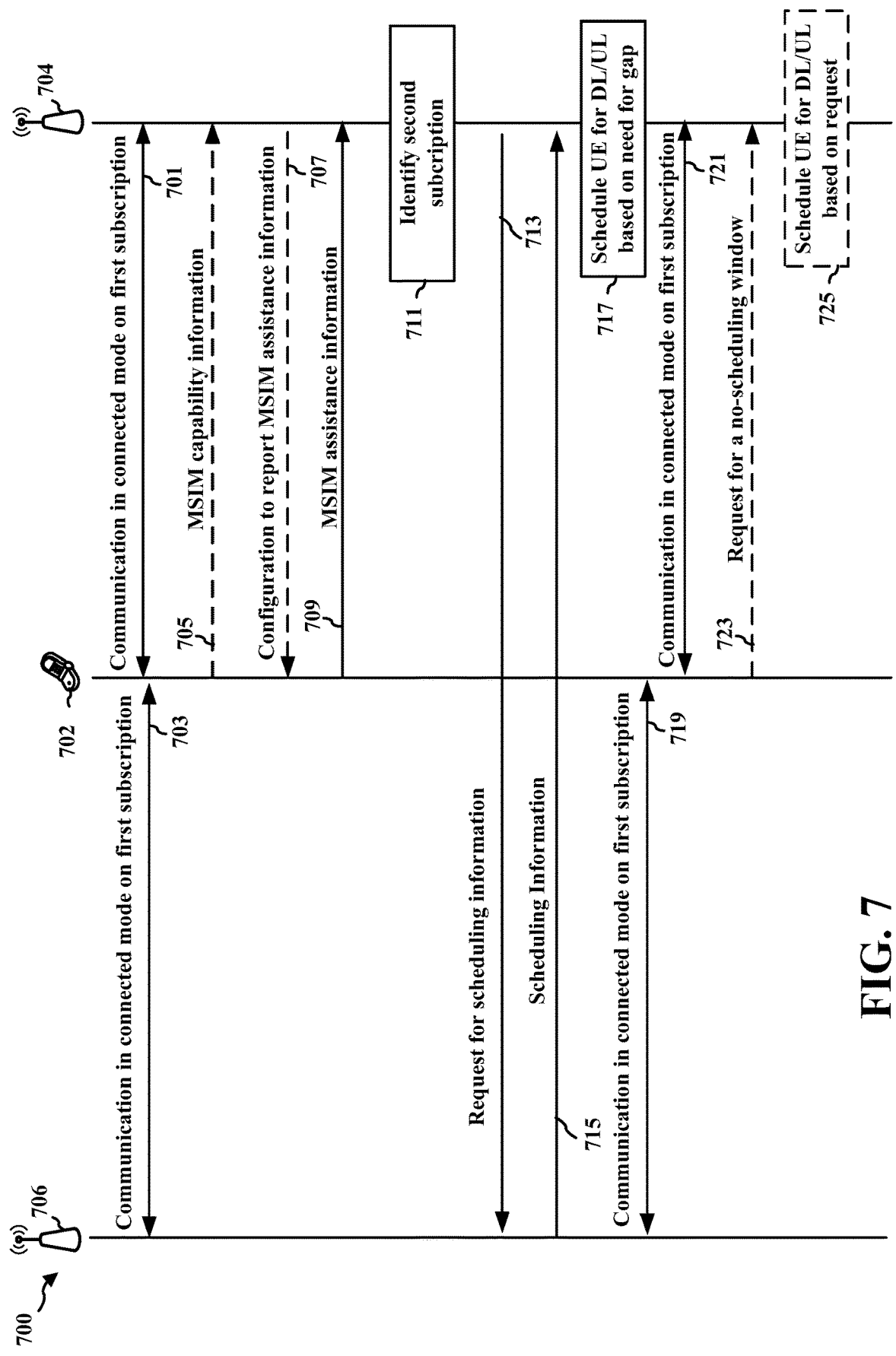
FIG. 7 illustrates an example communication flow between a UE and a base station.

FIG. 7 illustrates an example, communication flow 700 between a UE 702 that is actively communicating on a first subscription with base station 704 and on a second subscription with base station 706. UE may transmit/receive communication 701 on the first subscription and may transmit/receive communication 703 on the second subscription. At 709, the UE may provide MSIM assistance information to the network for the first subscription. As an example of MSIM assistance information, the UE may indicate a Radio Network Temporary Identifier (RNTI), such as a Cell RNTI (C-RNTI), associated with the second subscription. As another example, the UE may indicate, to the network associated with the first subscription, a cell ID associated with the second subscription. As described in connection with FIG. 6, the UE may indicate MSIM capability and/or an MSIM mode to the network of the first subscription, at 705. The UE may receive an indication 707 from the base station 704 configuring the UE to provide the MSIM assistance information. The indication 707 may cause the UE to report the MSIM assistance information, e.g., identifying the second subscription. If the UE does not receive an indication 707 to provide MSIM assistance information, the UE may refrain from sending the MSIM assistance information.

Using the received information, a first cell associated with the first subscription may identify the second subscription, e.g., at 711. The base station may identify that the second subscription is for a same PLMN or for a partner PLMN. The base station may communicate with a neighbor cell associated with the second subscription, e.g., over an X2 interface to address the interference between the two subscriptions a the UE. For example, the first cell may communicate with the neighbor cell if the two subscriptions are for a same PLMN. In another example, the first cell may communicate with the second cell if a PLMN of the first subscription has an agreement with the PLMN of the second subscription.

As an example, the base station 704 may send a request for scheduling information 713 to base station 706. Base station 704 may receive the scheduling information for the second subscription of the UE, at 715. After a first cell obtains the scheduling information of the other subscription from a neighbor cell, the first cell can schedule the UE on the first subscription, at 717, in order to reduce or limit the interference caused to the second subscription or caused by the second subscription. For example, communication 721 on the first subscription may be scheduled to avoid resources in time and/or frequency that will be used for communication 719 on the second subscription. In one example, the cell obtaining the scheduling information for the other subscription may be scheduling downlink transmissions to the UE. Thus, the cell may schedule downlink transmissions to avoid time and/or frequency resources that will be used for communication by the other subscription. Thus, the downlink communication can be scheduled so that it can be received more effectively at the UE by avoiding interference that would be caused by the other subscription. In another example, the cell obtaining the scheduling information for the other subscription may be scheduling uplink transmissions from the UE. Thus, the cell may schedule the uplink grant to avoid time and/or frequency resources that will be used for communication by the other subscription. Thus, the uplink grant can be scheduled in order to avoid causing interference to the other subscription.

Once the network is informed that both subscriptions belong to the same UE, the network can use the indicated PLMN, cell ID, C-RNTI, etc. for the subscription to jointly schedule the multiple subscriptions for the UE in order to reduce self interference.

As one example, a UE operating using carrier aggregation may be configured for a carrier for one subscription causes interference for a carrier of the other subscription. The MSIM assistance information may be used to select a carrier for the UE that will reduce or avoid interference for the carrier of the other subscription. As another example, the network may select an added SCC carrier(s) used in CA mode for the first subscription that will avoid or limit self-interference for the other subscription. The selection of the SCC may be based, e.g., on a mutual assistance agreement between operators for the multiple subscriptions. As another example, a single operator may improve MSIM performance by enabling coordination of carrier selection when both subscriptions are for the same operator.

As described in connection with FIG. 5, a UE may further request a break in scheduling, at 723. Although the request for a break in scheduling is illustrated as a separate message, the request may be comprised in MSIM assistance information 709. As an example, the UE may request the break on a particular carrier based on the radio resources that the UE plans to use for the other subscription. At 725, communication for the first subscription may be scheduled to avoid the resources indicated by the UE in the request for a window without scheduling on the first subscription.

The MSIM assistance information, as provided at 607 or 709, may be provided to the network as UE assistance information, e.g., as a UE assistance information IE.

The UE may indicate to the base station for the current, connected subscription DRX offset information about the offset of the next page on the other, idle subscription. For example, the DRX offset for the other, idle subscription may be indicated with respect to a last paging occasion of the current subscription. This offset may be indicated in units of subframes.

The UE may indicate to the base station for the current, connected subscription a periodicity of the DRX cycle of the other, idle subscription. As an example, the periodicity may provide a periodicity of the requested gaps on the first subscription for the UE to monitor for/decode a page of the other, idle subscription. Various examples of possible DRX cycle periodicities, including 1280 ms, 640 ms, 320 ms, 160 ms, 60 ms, and 40 ms. The UE may indicate one of these example lengths as a DRX periodicity for the other subscription. These lengths are merely examples to illustrate the concept. The concept of indicating to a base station for one subscription a DRX period for another, idle subscription can be applied for any DRX length.

The UE may indicate to the base station for the current, connected subscription a tune away duration to the current, connected subscription. The tune away duration may correspond to the UE specific length of time needed to tune away from the frequency band of the current, connected subscription to monitor for a page on the other, idle subscription. The tune away duration may be specific to the combination of the frequency bands of the two subscriptions. The tune away duration may be indicated, e.g., to a nearest integer number of ms.

The UE may indicate to the base station for the current, connected subscription a state of the other subscription. The state may include, e.g., a receive only state that may correspond to an idle state for the other subscription. In another example, the state may include a transmit only state for the other subscription. In another example, the state may include a receive and transmit state, e.g., a connected state for the other subscription.

The UE may indicate to the base station for the current, connected subscription a mode of the other subscription. For example, the UE may indicate whether the other subscription involves the UE operating as a transmitter that acts as an aggressor, e.g., that may cause interference to the current subscription. As another example, the UE may indicate that the other subscription involves the UE operating as a receiver that is a victim to interference due to the current subscription.

The UE may indicate to the base station for the current, connected subscription identifying information for the other subscription. As an example, the UE may indicate a C-RNTI for the other subscription. As another example, the UE may indicate a cell ID for the other subscription. As another example, the UE may indicate a PLMN ID of the other subscription. The C-RNTI, cell ID, and/or may be used by the network for the current subscription to uniquely identify the other subscription of the UE. As an example, the C-RNTI and cell ID may be used together to identify the other subscription. The network of the current subscription may adjust scheduling, etc. based on the identification of the other subscription. For example, the network may jointly schedule the UE based on the two subscriptions and/or may coordinate with the network of the other subscription in order to coordinate scheduling of the UE to avoid missed communication or interference due to the multiple subscriptions of the UE.

Prior to sending the MSIM assistance information, the UE may indicate to the network that the UE supports MSIM capabilities, e.g., as described in connection with 603, 705. For example, an IE may be provided by the UE as part of a UE-NR capability exchange to indicate MSIM capability to the network of one of the subscriptions. The UE may use the IE to indicate that the UE comprises more than one subscription. The UE may further indicate that the UE is capable of MSIM operation. The UE may indicate a type of MSIM capability supported by the UE, e.g., an indication of a single subscription capability; a dual standby capability (e.g., DSDS); a dual receive capability (in which the UE is capable of receiving communication on the two subscriptions); a dual transmit capability (in which the UE is capable of transmitting communication on the two subscriptions); or a dual active capability (e.g., DSDA).

A base station may response by sending an IE to a UE, e.g., in response to the UE indicating MSIM capability. The base station may indicate to the UE whether to provided MSIM capability information. The indication may comprise a configuration of the UE to provide MSIM capability report(s), e.g., as described in connection with 605, 707. For example, a parameter (e.g., MSIMAssistanceConfig) may be used to indicate whether the base station is requesting MSIM assistance information from the UE. If configured to provide MSIM assistance information, the UE may send UE capability information relating to MSIM operation. If the UE is not configured to provide MSIM assistance information, the UE may refrain from sending such information. The base station may provide timing information that enables the UE to determine when, or how often, to send reports of such MSIM assistance information. For example, an MSIM assistance prohibit timer may be provided for the MSIM assistance request from the base station that may help the UE to determine an amount of time that should pass after sending MSIM assistance information before the UE should send next MSIM assistance information. The MSIM assistance prohibit timer may have a value in seconds. Example options of time values for an MSIM assistance prohibit timer, may correspond to s0 indicating zero seconds. S0dot 4 may correspond to 0.4 seconds, s1 may correspond to 1 second, s2 may correspond to 2 seconds, and so forth. These example times are merely used to illustrate the concept, which may also apply to different amounts of time. The timer may start upon the UE transmitting MSIM assistance information, e.g., in a UE assistance information message. The timer may stop upon the UE initiating the connection re-establishment procedure and upon the UE initiating the connection resumption procedure.

As an example, the RRC reconfiguration message may include a request for a window of time without scheduling from one subscription in order to perform an activity on another subscription, e.g., as described in connection with 623, 723.

Table 1 illustrates examples of a few band combinations that may cause self-interference. Other band combinations that are not included in Table 1 may also cause self-interference. This Table is merely an example to illustrate the concept.

TABLE 1

| Band Combo: PCC + SCC | Victim | Interference Type | BW Combo: PCC + SCC | Example Frequencies |
|---|---|---|---|---|
| B17 + B4 | B4 (SCC) | H3 | (5,10) + (5,10) | B17 Tx: 711 MHz; Rx: 741 MHz<br>B4 Tx: 1733 MHz; Rx: 2133 MHz<br>3 * 711 = 2133 MHz = B4 Rx |
| B12 + B4 | B4 (SCC) | H3 | (5,10) + (5,10,20) | B12 Tx: 711; Rx: 741<br>B4 Tx: 1733 MHz; Rx: 2133<br>3 * 711 = 2133 MHz = B4 Rx |
| B8 + B3 | B3 (SCC) | H2 | (5,10) + (5,10,20) | B8 Tx: 905 MHz; Rx: 950 MHz<br>B3 Tx: 1715 MHz; Rx: 1810 MHz<br>2 * 905 = 1810 MHz = B3 Rx |
| B4 + B2 | B4 (PCC) | Linear | (5,10,20) + (5,10,20) | B4 Tx: 1735 MHz; Rx: 2135 MHz<br>B2 Tx: 1855 MHz; Rx: 1935 MHz<br>2 * 1935 − 1735 = 2135 MHz = B4 Rx |
| B3 + B3 (Non Contiguous) | B3 (PCC) | Linear | (5,10,20) + (5,10,20) | B3_p Tx: 1770 MHz; Rx: 1865 MHz<br>B3_s Tx: 1722.5 MHz; Rx: 1817.5 MHz<br>2 * 1817.5 − 1770 = 1865 MHz = B3_p Rx |
| B2 + B2 (Non Contiguous) | B2 (PCC) | Linear | (5,10,20) + (5,10,20) | B2_p Tx: 1895 MHz; Rx: 1975 MHz<br>B2_s Tx: 1855 MHz; Rx: 1935 MHz<br>2 * 1935 − 1895 = 1975 MHz = B2_p Rx |
| B8 + B7 | B7 (SCC) | H3 | (5,10) + (10,20) | B8 Tx: 885 MHz; Rx: 930 MHz<br>B7 Tx: 2535 MHz; Rx: 2655 MHz<br>3 * 885 = 2655 MHz = B7 Rx |
| B28 + B1 | B1 (SCC) | H3 | (5,10,20) + (5,10,20) | B28 Tx: 715 MHz; Rx: 770 MHz<br>B1 Tx: 1955 MHz; Rx: 2145 MHz<br>3 * 715 = 2145 MHz = B1 Rx |
| B3 + B5 | B3 (PCC) or B5 (SCC) | Linear | (5,10,20) + (5,10) | B3 Tx: 1724.5 MHz; Rx: 1819.5 MHz<br>B5 Tx: 841 MHz; Rx: 886 MHz<br>IMD @ 4 * 886 − 1724.5 = 1819.5 = B3 Rx<br>B3 Tx: 1772 MHz; Rx: 1857 MHz<br>B5 Tx: 841 MHz; Rx: 886 MHz<br>2 * 886 (B5 Rx LO) = 1772 MHz |
| B3 + B26 | B26 (SCC) | Linear | (5,10,20) + (5,10) | B3 Tx: 1768 MHz; Rx: 1863 MHz<br>B26 Tx: 839 MHz; Rx: 884 MHz<br>1768 − 884 = 884 MHz = B26 Rx |
| B3 + B19 | B19 (SCC) | Linear | (5,10,20) + (5,10) | B3 Tx: 1775 MHz; Rx: 1870 MHz B19 Tx: 842.5 MHz; Rx: 887.5 MHz<br>1775 − 887.5 = 887.5MHz = B19 Rx |
| B4 + B5 | B5 (SCC) | Linear | (5,10) + (5,10) | B4 Tx: 1748 MHz; Rx: 2148 MHz B5 Tx: 829 MHz; Rx: 874 MHz 1748 − 874 = 874 MHz = B5 Rx |
| B7 + B7 (Non | B7 (PCC) | Linear | 10 + 10 | B7_p Tx: 2565 MHz; Rx: 2685 MHz |

TABLE 1-continued

| Band Combo: PCC + SCC | Victim | Inter-ference Type | BW Combo: PCC + SCC | Example Frequencies |
|---|---|---|---|---|
| Contig-uous) | | | | B7_s Tx: 2505 MHz: Rx: 2625 MHz<br>2 * 2625 − 2565 = 2685 MHz = B7_p Rx |

Furthermore, an aggressor and a victim can be on a same operator or on different operators. A UE may support a number of non-overlapping frequency bands and a number of overlapping frequency bands. As an example, an LTE UE may support 18 non-overlapping bands and 8 overlapping frequency bands (e.g., B4 and B66). Only a small set of frequency bands may be supported per Mobile Country Code (MCC). Different network carriers may use shared frequency bands.

Figure 8:
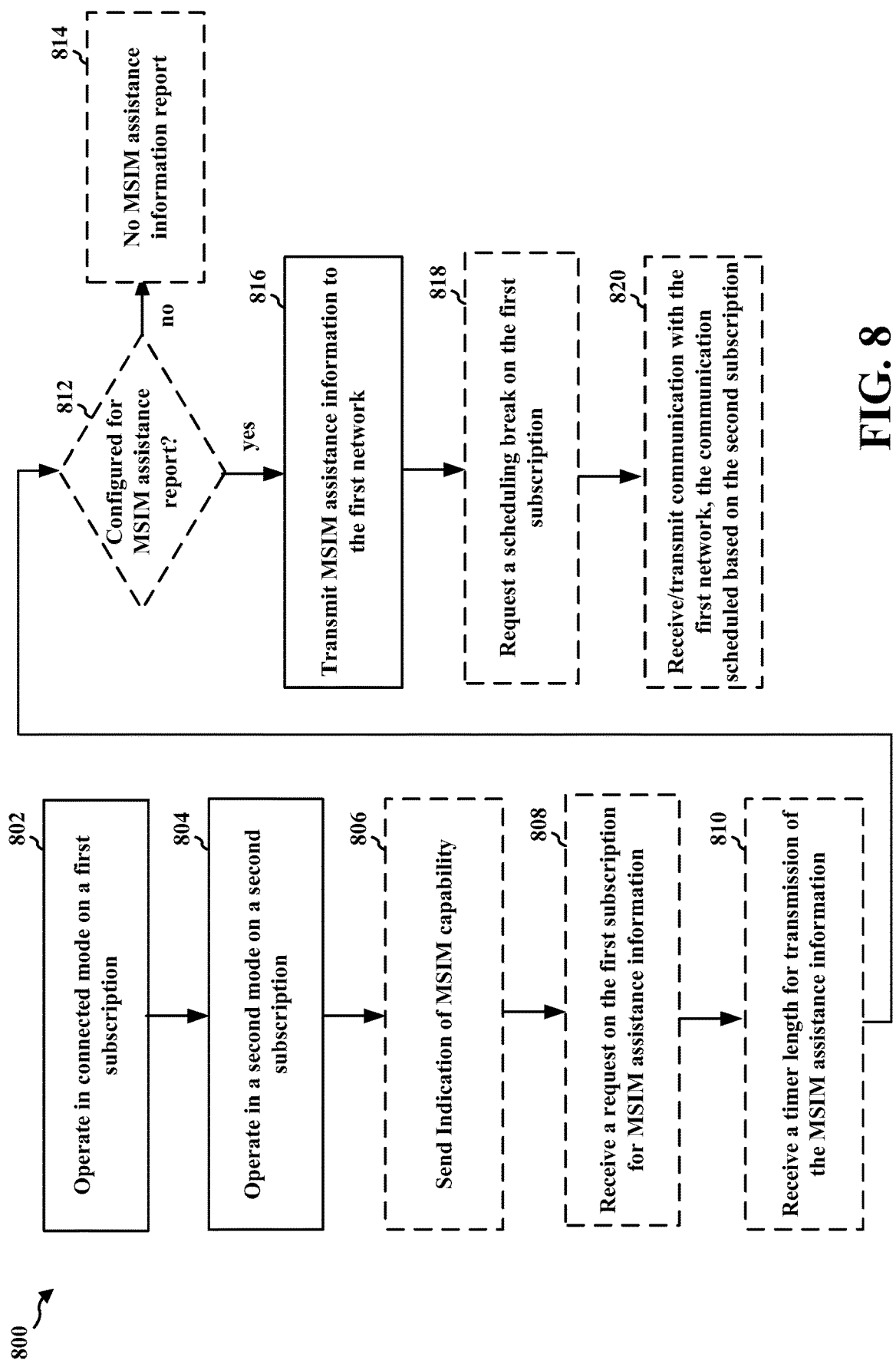
FIG. 8 is a flowchart of a method of wireless communication.

FIG. 8 is a flowchart 800 of a method of wireless communication. The method may be performed by a UE (e.g., the UE 104, 350, 602, 702; the apparatus 902/902; the processing system 1014, which may include the memory 360 and which may be the entire UE 350 or a component of the UE 350, such as the TX processor 368, the RX processor 356, and/or the controller/processor 359). Optional aspects are illustrated with a dashed line. The method improves communication by a MSIM device, by enabling a reduction in throughput degradation due to missed communication on one of multiple subscriptions. The method further enables a more efficient use of wireless resources.

At 802, the UE operates in a connected mode on a first subscription with a first network. For example, the UE may be transmitting or receiving communication from a base station, as illustrated at 601 in FIGS. 6 and 701 in FIG. 7. Thus, the first subscription may be in an active mode.

At 804, the UE operates in a second mode on a second subscription, e.g., for a second network. The second mode on the second subscription may comprise an idle mode in which the UE periodically monitors for a page on the second subscription, as described in connection with FIGS. 4-6. Thus, the UE may be operating in a DSDS mode. In another example, the second mode may comprise a connected mode or an active mode, similar to the first subscription. Thus, the UE may be receiving and/or transmitting communication on the second subscription in an overlapping time manner with the communication on the first subscription, e.g., as described in connection with FIG. 7. Thus, the UE may be operating in a DSDA mode.

At 816, the UE transmits, to the first network, MSIM assistance information regarding the second subscription. Examples of MSIM assistance information are described in connection with 607 in FIGS. 6 and 709 in FIG. 7. The MSIM assistance information regarding operation in the idle mode for the second subscription may comprise a metric of a page on the second subscription. The MSIM assistance information may comprise DRX information about a DRX cycle of the second subscription. The MSIM assistance information may comprise a tune away duration for tuning away from a first frequency band for the first subscription to a second frequency band for the second subscription. The MSIM assistance information may comprise identifier information for the second subscription or the second network for the second subscription, such as a PLMN ID, an RNTI (e.g., C-RNTI), and/or a cell ID associated with the second subscription. The MSIM assistance information may be indicated in a UE assistance information message to the first network.

As illustrated at 818, the UE may request a scheduling break during a period of time based on resources that the UE will use for the second subscription. The scheduling break may be requested for a carrier of the first subscription that relates to the resources that the UE will use for the second subscription. The resources may be the same, may overlap, or may have the potential to experience interference between communication for the two subscriptions. The scheduling break may be requested in a MAC message, e.g., a MAC CE. FIGS. 6 and 7 illustrate example messages 623, 723 requesting a scheduling break.

As illustrated at 806, prior to sending the MSIM assistance information, the UE may send an indication of MSIM assistance capability to a base station. The indication may be sent in a UE capability message. FIGS. 6 and 7 illustrate example messages 603, 705 in which the UE may indicate an MSIM capability to the base station.

At 808, the UE may receive a request on the first subscription for the MSIM assistance information from the base station. The MSIM assistance information may be received in response to the request. Thus, the UE may be configured to send MSIM assistance information reports and may respond accordingly. As illustrated at 812, the UE may determine whether the network has configured the UE to provide MSIM related reports. FIGS. 6 and 7 illustrate examples of a message 605, 707 that may indicate to the UE a configuration to provide MSIM assistance information to the network. If the UE has been configured to transmit MSIM reports, e.g., by the indication received at 808, the UE may proceed to transmit the MSIM assistance information at 816. If the UE has not been configured to transmit MSIM reports, the UE may refrain from transmitting MSIM assistance information to the network, at 814.

As illustrated at 810, the UE may further receive a timer length for transmission of the MSIM assistance information. For example message 605, 707 configuring the UE to provide MSIM assistance information, may also include MSIM assistance prohibit timer information. Following transmission of first MSIM assistance information, the UE may wait until expiration of the indicated timer length before sending additional MSIM assistance information to the network.

As illustrated at 820, the UE may receive/transmit communication with the first network. The communication may be based, at least in part, on the second subscription. As described in connection with FIG. 6, the MSIM assistance information may enable a base station to schedule the UE to accommodate for periodic gaps to monitor for pages on an idle subscription. The communication may be scheduled to accommodate the requested break in scheduling, e.g., in response to 818. The communication may be scheduled after the network obtains scheduling information for the other subscription, as described in connection with FIG. 7.

Figure 9:
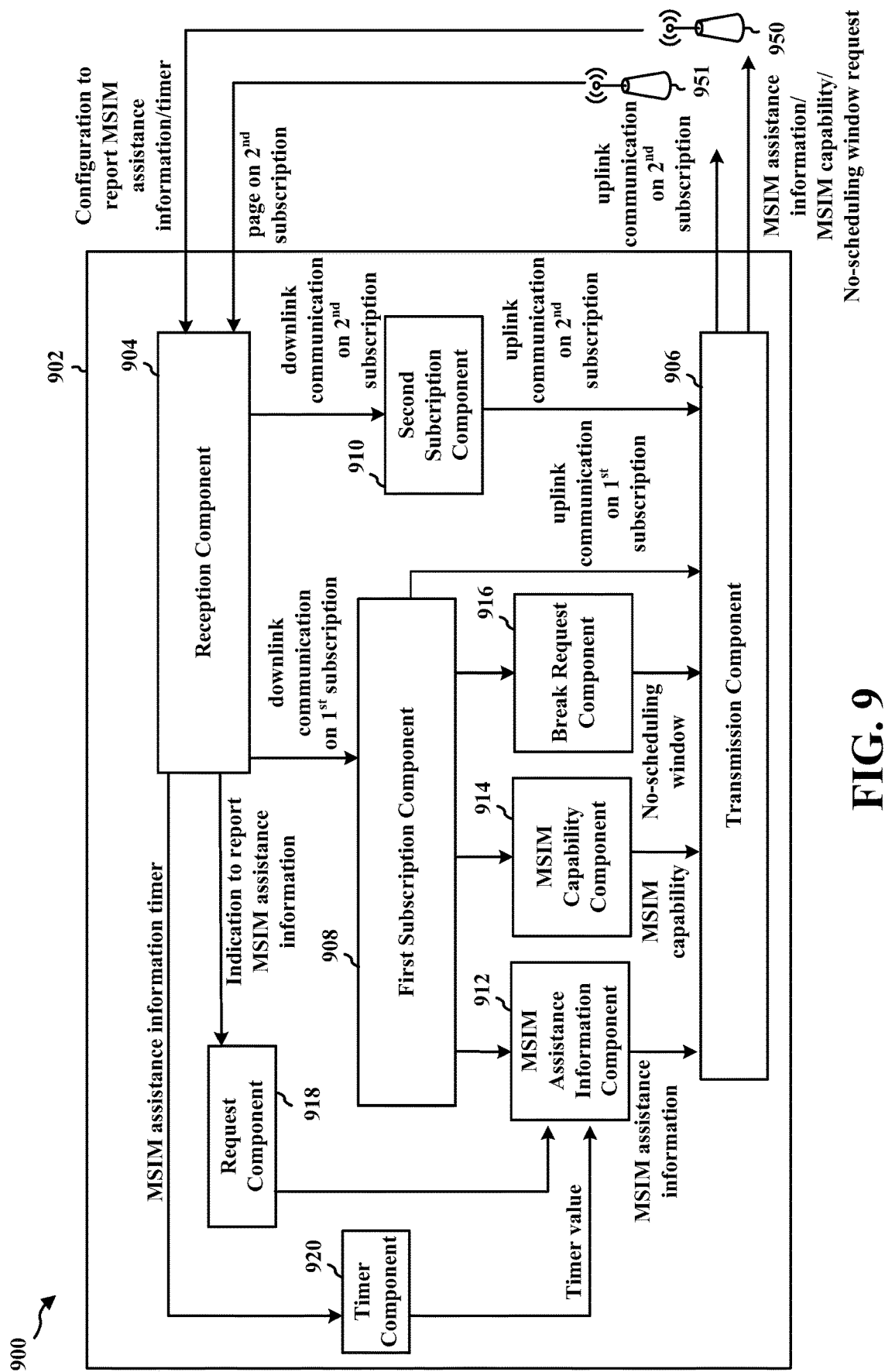
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE (e.g., the UE 104, 350, 602, 702) or a component of a UE. The apparatus includes a reception component 904 that receive downlink communication from base station 950, and a transmission component 906 that transmits uplink communication to the base station 950. The apparatus includes a first subscription component 908 configured to operate in a connected mode on a first subscription with a first network, e.g., via base station 950. The apparatus includes a second subscription component 910 configured to operate in a second mode on a second subscription for a second network, e.g., via base station 951. The apparatus may operate in a DSDS mode and/or a DSDA mode. The apparatus includes an MSIM assistance information component 912 configured to transmit, to the first network, e.g., base station 950, MSIM assistance information regarding the second subscription, e.g., as described in connection with 816. The apparatus may include a break request component 916 configured to request a scheduling break on a carrier of the first subscription during a period of time based on resources that the UE will use for the second subscription. The apparatus may include an MSIM capability component 914 configured to send an indication of MSIM assistance capability to a base station. The apparatus may include a request component 918 configured to receive a request, e.g., a configuration, on the first subscription for the MSIM assistance information from the base station, wherein the MSIM assistance information is sent in response to the request. The apparatus may comprise a timer component 920 configured to receive a timer length for transmission of the MSIM assistance information, wherein following transmission of first MSIM assistance information, the UE waits until expiration of the timer length before sending additional MSIM assistance information. The reception component 904 may be configured to receive communication with the first network, wherein the communication is scheduled based in part on the second subscription. The transmission component 906 may be configured to transmit communication with the first network, wherein the communication is scheduled based in part on the second subscription.

The apparatus may include additional components that perform each of the blocks of the algorithm in the aforementioned flowcharts of FIGS. 6, 7, and 8. As such, each block in the aforementioned flowcharts of FIGS. 6, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
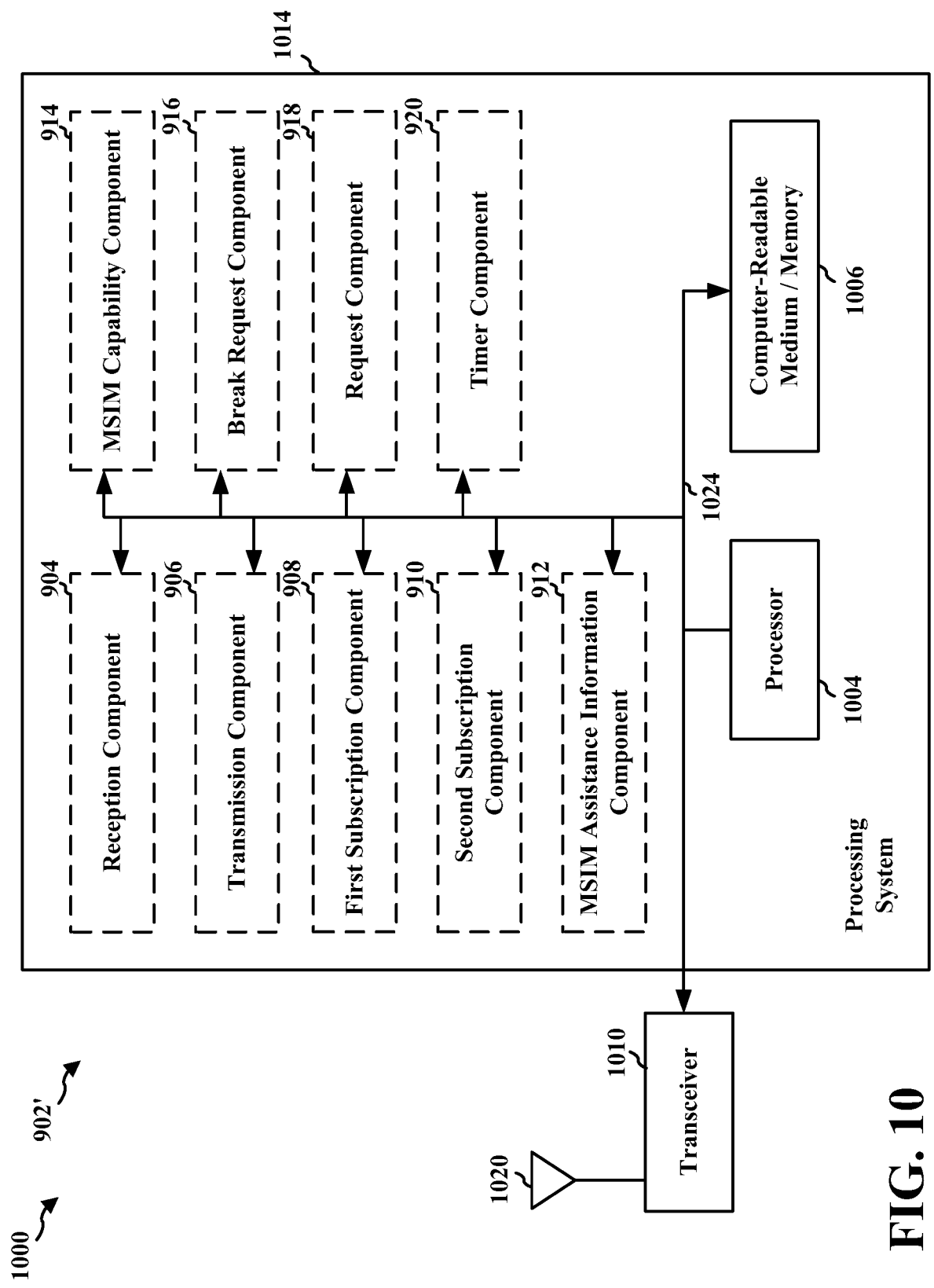
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for operating in a connected mode on a first subscription with a first network, e.g., as described in connection with 802. The apparatus may include means for operating in a second mode on a second subscription for a second network, e.g., as described in connection with 804. The apparatus may include means for transmitting, to the first network, MSIM information regarding the second subscription, e.g., as described in connection with 816. The apparatus may include means for requesting a scheduling break on a carrier of the first subscription during a period of time based on resources that the UE will use for the second subscription, e.g., as described in connection with 818. The apparatus may include means for sending an indication of MSIM assistance capability to a base station, e.g., as described in connection with 806. The apparatus may include means for receiving a request on the first subscription for the MSIM assistance information from the base station, wherein the MSIM assistance information is sent in response to the request, e.g., as described in connection with 808. The apparatus may include means for receiving communication with the first network, wherein the communication is scheduled based in part on the second subscription, e.g., as described in connection with 820. The apparatus may include means for transmitting communication with the first network, wherein the communication is scheduled based in part on the second subscription, e.g., as described in connection with 820. The apparatus may include means for receiving a timer length for transmission of the MSIM assistance information, wherein following transmission of first MSIM assistance information, the UE waits until expiration of the timer length before sending additional MSIM assistance information, e.g., as described in connection with 810. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
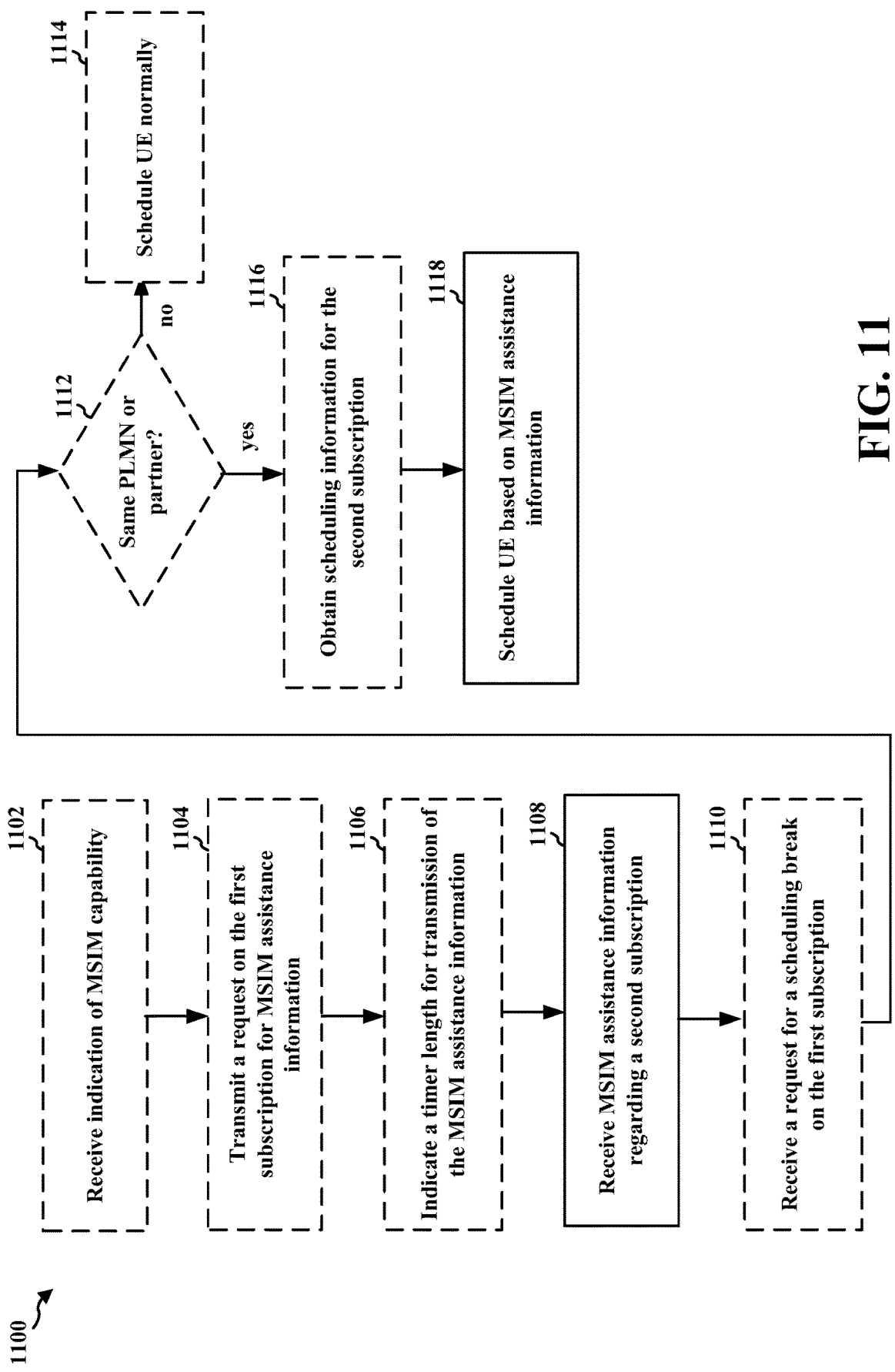
FIG. 11 is a flowchart of a method of wireless communication.

FIG. 11 is a flowchart 1100 of a method of wireless communication. The method may be performed by a base station (e.g., the base station 102, 180, 310, 604, 704, 950; the apparatus 1202/1202'; the processing system 1314, which may include the memory 376 and which may be the entire base station 310 or a component of the base station 310, such as the TX processor 316, the RX processor 370, and/or the controller/processor 375). Optional aspects are illustrated with a dashed line. The method improves communication of a base station with a MSIM capable UE, by enabling a reduction in throughput degradation due to missed communication on one of multiple subscriptions. The method further enables a more efficient use of wireless resources through scheduling at the base station based on MSIM assistance information from the UE.

At 1108, MSIM assistance information is received, from a UE operating in a connected mode based on a first subscription with a first network. The MSIM assistance information is regarding operation in a second mode for a second subscription. Examples of MSIM assistance information 607, 709 are illustrated in FIGS. 6 and 7. The MSIM assistance information may include at least one of a metric of a page on the second subscription, DRX information about a DRX cycle of the second subscription, a tune away duration for tuning away from a first frequency band for the first subscription to a second frequency band for the second subscription, a communication state for the second subscription, an aggressor mode, an identifier information for the second subscription, or a request for a scheduling break on a carrier. The identifier information may include at least one of a PLMN ID associated with the second subscription, an RNTI (e.g., C-RNTI) associated with the second subscription, or a cell identifier associated with the second subscription. The MSIM assistance information may be received in a UE assistance information message from the UE. As described in connection with 623 in FIG. 6, a UE may request a window without scheduling on a specific carrier of a connected subscription, e.g., when in a carrier aggregation mode. The window may correspond to a time during which the UE intends to monitor for communication on an idle subscription. The request for a scheduling break may lead a base station of the connected mode subscription to refrain from scheduling the UE on the indicated carrier during the indicated time while continuing with normal network scheduling on the other carriers. In another example, the MSIM assistance information may be received in another type of message, e.g., in a MAC CE.

At 1118, communication with the UE is scheduled based on the MSIM assistance information. The second mode on the second subscription comprises an idle mode, and periodic time gaps may be scheduled for the UE to monitor for a page of the second subscription, as described in connection with FIGS. 4-6. The periodic time gaps may be scheduled, at 1118, using the MSIM assistance information received from the UE. In another example, at 1118, a time outside of the periodic time gaps may be selected to transmit control signaling to the UE. This will help to ensure that the UE receives such control signaling and is able to receive following communication, whereas the UE may be unable to receive control signaling while monitoring for communication on the second subscription.

As illustrated at 1112, a base station may determine whether the second subscription is for a same PLMN as the first subscription or whether the first network has an agreement with a second network of the second subscription. If the second subscription is for the same PLMN as the first subscription or the first network has the agreement with the second network, the UE may be scheduled, at 1118, to avoid communication with the UE during the periodic time gaps. If the PLMN is different and there is no agreement between the PLMNs for the two subscriptions, the base station may schedule the UE without regard to the second subscription, e.g., at 1114.

As illustrated at 1116, the base station may obtain scheduling information for the UE from a second network for the second subscription, and the UE may be scheduled, at 1116, to avoid resources based on the scheduling information obtained from the second network. For example, the second mode may comprises an active mode in which the UE communicates actively on both the first subscription and the second subscription, e.g., DSDA. By obtaining the scheduling information for the other subscription, the communication for one subscription may be scheduled to limit or reduce self-interference at the UE. For example, the base station may schedule the UE to avoid the resources based on a carrier aggregation mode. An SCC may be configured for the UE using the scheduling information obtained from the second network to limit interference with the second subscription.

As illustrated at 1110, the base station may receive a request for a scheduling break on the first subscription during a period of time based on time or frequency resources that the UE will use for the second subscription. The request may correspond to a particular carrier. The request may be received in a MAC CE. Example requests are described in connection with 623, 723 in FIGS. 6 and 7.

As illustrated at 1102, prior to receiving the MSIM assistance information, the base station may receive an indication of MSIM capability from the UE. The indication may be received, e.g., in a UE capability message. FIGS. 6 and 7 illustrate examples of MSIM capability information 603, 705.

At 1104, in response to receiving the MSIM capability indication, the base station may transmit a request on the first subscription for the MSIM assistance information from the UE. For example, the base station may configure the UE to provide MSIM assistance report(s). FIGS. 6 and 7 illustrate example messages 605, 707 that the base station may send to indicate to the UE to provide the MSIM assistance information.

At 1106, in addition to requesting MSIM assistance information, the base station may indicate a timer length for transmission of the MSIM assistance information. For example, message 605, 607 that configure the UE to provide MSIM assistance information, may also include MSIM assistance prohibit timer information. Following transmission of first MSIM assistance information, the UE may wait until expiration of the indicated timer length before sending additional MSIM assistance information to the network.

Figure 12:
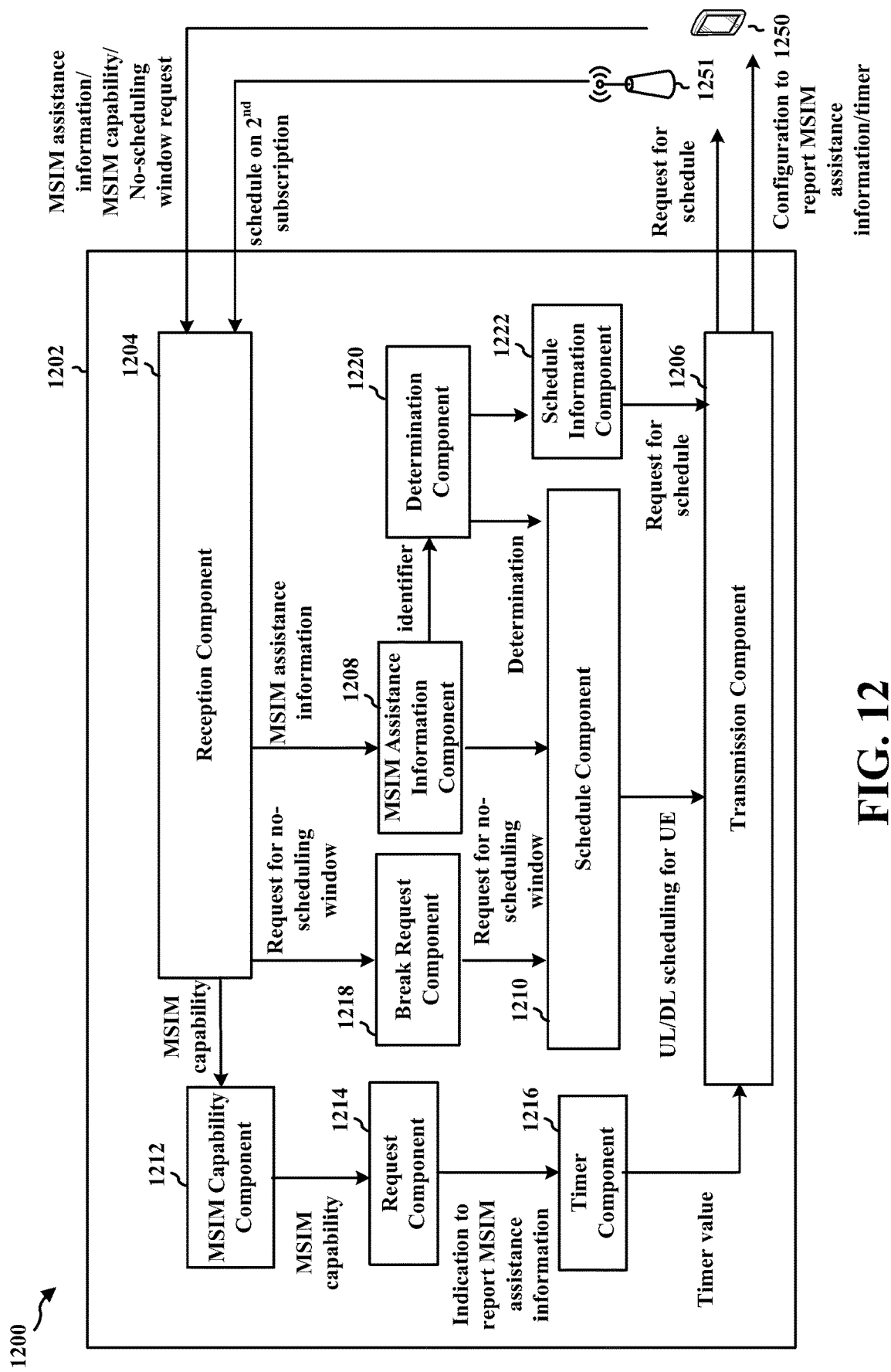
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g., base station 102, 180, 310, 604, 704, 950) or a component of a base station. The apparatus includes a reception component 1204 that receives uplink communication from UE 1250 and/or information from another network, e.g., from another base station 1251. The apparatus includes a transmission component 1206 that transmits downlink communication to UE 1250 and/or transmits communication to another network. The apparatus includes MSIM assistance information component 1208 configured to receive, from a UE 950 operating in a connected mode based on a first subscription with a first network, MSIM assistance information regarding operation in a second mode for a second subscription, e.g., as described in connection with 1108. The apparatus includes a schedule component 1210 configured to schedule the UE based on the MSIM assistance information, e.g., as described in connection with 1118. The apparatus may include a determination component 1220 configured to determine whether the second subscription is for a same PLMN as the first subscription or whether the first network has an agreement with a second network of the second subscription, e.g., as described in connection with 1112. The schedule component 1210 may schedule the UE to avoid communication with the UE during the periodic time gaps if the second subscription is for the same PLMN as the first subscription or the first network has the agreement with the second network. The apparatus may include schedule information component 1222 configured to obtain scheduling information for the UE from a second network, e.g., from a base station 1251, for the second subscription, wherein the UE is scheduled to avoid resources based on the scheduling information obtained from the second network, e.g., as described in connection with 1116. The apparatus may include break request component 1218 configured to receive a request for a scheduling break on the first subscription during a period of time based on time or frequency resources that the UE will use for the second subscription, e.g., as described in connection with 1110. The apparatus may include MSIM capability component 1212 configured to receive an indication of MSIM assistance capability from the UE, e.g., as described in connection with 1102. The apparatus may include request component 1214 configured to transmit a request on the first subscription for the MSIM assistance information from the UE, wherein the MSIM assistance information is received in response to the request, e.g., as described in connection with 1104. The apparatus may include timer component 1216 configured to indicate a timer length, to the UE, for transmission of the MSIM assistance information, e.g., as described in connection with 1106.

The apparatus may include additional components that perform each of the blocks of the algorithm in the aforementioned flowcharts of FIGS. 6, 7, and 11. As such, each block in the aforementioned flowcharts of FIGS. 6, 7, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
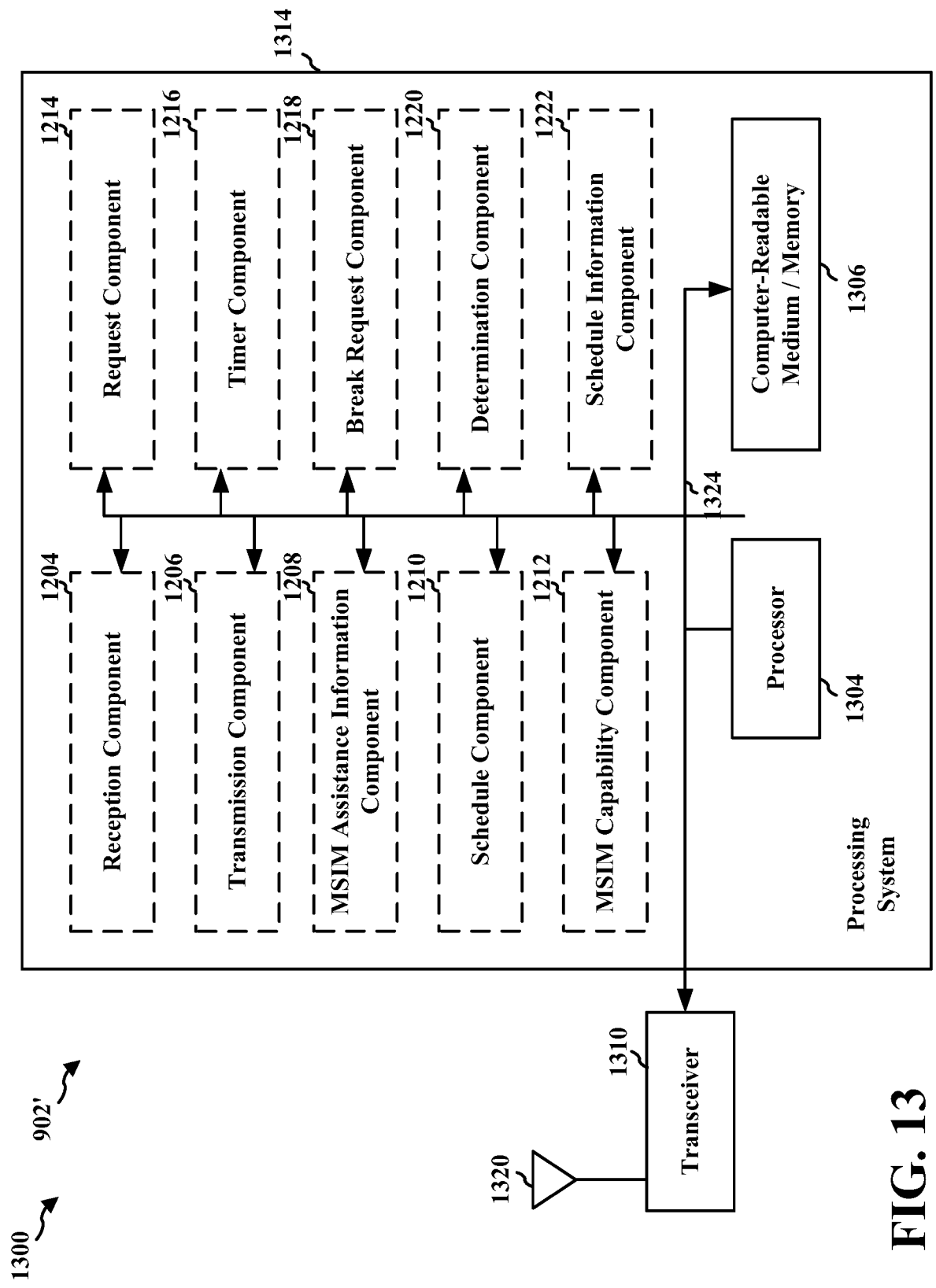
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, 1222, and the computer-readable medium/ memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220, 1222. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for receiving, from a UE operating in a connected mode based on a first subscription with a first network, MSIM assistance information regarding operation in a second mode for a second subscription, e.g., as described in connection with 1108. The apparatus may include means for scheduling the UE based on the MSIM assistance information, e.g., as described in connection with 1118. The apparatus may include means for determining whether the second subscription is for a same PLMN as the first subscription or whether the first network has an agreement with a second network of the second subscription, e.g., as described in connection with 1112. The base station may schedule the UE to avoid communication with the UE during the periodic time gaps if the second subscription is for the same PLMN as the first subscription or the first network has the agreement with the second network. The apparatus may include means for obtaining scheduling information for the UE from a second network for the second subscription, wherein the UE is scheduled to avoid resources based on the scheduling information obtained from the second network, e.g., as described in connection with 1116. The apparatus may include means for receiving a request for a scheduling break on the first subscription during a period of time based on time or frequency resources that the UE will use for the second subscription, e.g., as described in connection with 1110. The apparatus may include means for receiving an indication of MSIM assistance capability from the UE, e.g., as described in connection with 1102. The apparatus may include means for transmitting a request on the first subscription for the MSIM assistance information from the UE, wherein the MSIM assistance information is received in response to the request, e.g., as described in connection with 1104. The apparatus may include means for indicating a timer length, to the UE, for transmission of the MSIM assistance information, e.g., as described in connection with 1106. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

A MSIM capable UE may operate in a connected mode on a first subscription with a first network and operates on a second subscription in an idle mode or an active mode. The UE may miss communication on the first subscription by tuning away for activity on the second subscription. As presented herein, the may UE transmit, to the first network, MSIM assistance information regarding the second subscription. The MSIM assistance information may enable the network to determine periodic gaps needed by the UE to monitor a second subscription in an idle mode. The MSIM assistance information may enable the network to identify a network for the second subscription and to obtain scheduling information directly from that network. Therefore, the MSIM assistance information may enable the first network to more effectively schedule the UE whether based on DRX information about the second subscription that is received directly from the UE or by obtaining scheduling information for the second subscription from a network, e.g., via an X2 interface.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    operating in a connected mode on a first subscription with a first network;
    operating in a second mode on a second subscription for a second network; and
    transmitting, to the first network, Multiple Subscriber Identity Module (MSIM) assistance information regarding the second subscription, the MSIM assistance information including at least one of idle mode information for the second subscription for the second network or a cell identifier (ID) for the second subscription fir the second network.

2. The method of claim 1, wherein the second mode on the second subscription comprises an idle mode, and wherein the MSIM assistance information includes idle mode information for the second subscription.

3. The method of claim 2, wherein the idle mode information for the second subscription comprises a metric of a page on the second subscription.

4. The method of claim 2, wherein the idle mode information comprises Discontinuous Reception (DRX) information about a DRX cycle of the second subscription.

5. The method of claim 2, wherein the idle mode information comprises a tune away duration for tuning away from a first frequency band for the first subscription to a second frequency band for the second subscription.

6. The method of claim 2, wherein the MSIM assistance information comprises identifier information for the second subscription or the second network for the second subscription.

7. The method of claim 6, wherein the identifier information comprises a Public Land Mobile Network Identifier (PLMN ID).

8. The method of claim 1, wherein the MSIM assistance information comprises the cell ID associated with the second subscription.

9. The method of claim 8, wherein the second mode on the second subscription comprises an active mode.

10. The method of claim 1, wherein the MSIM assistance information is indicated in a UE assistance information message to the first network.

11. The method of claim 1, further comprising:
    requesting a scheduling break on a carrier of the first subscription during a period of time based on resources that the UE will use for the second subscription.

12. The method of claim 11, wherein the scheduling break is requested in a Medium Access Control (MAC) Control Element (CE).

13. The method of claim 1, further comprising:
sending an indication of MSIM assistance capability to a base station; and
receiving a request on the first subscription for the MSIM assistance information from the base station, wherein the MSIM assistance information is received in response to the request.

14. The method of claim 1, further comprising:
receiving or transmitting communication with the first network, wherein the communication is scheduled based in part on the second subscription.

15. The method of claim 1, further comprising:
receiving a timer length for transmission of the MSIM assistance information, wherein following transmission of first MSIM assistance information, the UE waits until expiration of the timer length before sending additional MSIM assistance information.

16. A method of wireless communication, comprising:
receiving, from a User Equipment (UE) operating in a connected mode based on a first subscription with a first network, Multiple Subscriber Identity Module (MSIM) assistance information regarding operation in a second mode for a second subscription for a second network, the MSIM assistance information including at least one of idle mode information for the second subscription for the second network or a cell identifier (ID) for the second subscription for the second network; and
scheduling the UE based on the MSIM assistance information.

17. The method of claim 16, wherein the MS IM assistance information comprises the idle mode information, and wherein the idle mode information includes at least one of a metric of a page on the second subscription, Discontinuous Reception (DRX) information about a DRX cycle of the second subscription, a tune away duration for tuning away from a first frequency band for the first subscription to a second frequency band for the second subscription, or a request for a scheduling break on a carrier.

18. The method of claim 17, wherein the MSIM assistance information comprises at least one of a Public Land Mobile Network Identifier (PLMN ID) associated with the second subscription, or a cell identifier associated with the second subscription.

19. The method of claim 16, wherein the MSIM assistance information is received in a UE assistance information message from the UE.

20. The method of claim 16, wherein the second mode on the second subscription comprises an idle mode, and wherein scheduling the UE includes scheduling periodic time gaps for the UE to monitor for a page of the second subscription, wherein the periodic time gaps are scheduled using the MSIM assistance information received from the UE.

21. The method of claim 20, further comprising:
selecting a time outside of the periodic time gaps to transmit control signaling to the HE.

22. The method of claim 20, further comprising:
determining whether the second subscription is for a same Public Land Mobile Network (PLMN) as the first subscription or whether the first network has an agreement with a second network of the second subscription, wherein the UE is scheduled to avoid communication with the UE during the periodic time gaps if the second subscription is for the same PLMN as the first subscription or the first network has the agreement with the second network.

23. The method of claim 16, wherein the second mode comprises an active mode, the method further comprising:
obtaining scheduling information for the HE from a second network for the second subscription, wherein the UE is scheduled to avoid resources based on the scheduling information obtained from the second network.

24. The method of claim 23, wherein a base station that schedules the HE to avoid the resources based on the scheduling information configured the UE for a carrier aggregation mode, wherein a Secondary Component Carrier (SCC) is configured for the HE using the scheduling information obtained from the second network to limit interference with the second subscription.

25. The method of claim 16, further comprising:
receiving a request for a scheduling break on the first subscription during a period of time based on time or frequency resources that the UE will use for the second subscription.

26. The method of claim 25, wherein the request for the scheduling break is received in a Medium Access Control (MAC) Control Element (CE).

27. The method of claim 16, further comprising:
receiving an indication of MSIM assistance capability from the UE; and
transmitting a request on the first subscription for the MSIM assistance information from the UE, wherein the MSIM assistance information is received in response to the request.

28. The method of claim 16, further comprising:
indicating a timer length, to the UE, for transmission of the MSIM assistance information.

29. An apparatus for wireless communication at a User Equipment (UE), comprising:
a memory; and
at least one processor coupled to the memory and configured to:
operate in a connected mode on a first subscription for a first network;
operate in a second mode on a second subscription for a second network; and
transmit, to the first network, Multiple Subscriber Identity Module (MSIM) assistance information regarding the second subscription, the MSIM assistance information including at least one of idle mode information for the second subscription for the second network or a cell identifier (ID) for the second subscription for the second network.

30. An apparatus for wireless communication, comprising:
a memory; and
at least one processor coupled to the memory and configured to:
receive, from a User Equipment (UE) operating in a connected mode based on a first subscription, Multiple Subscriber Identity Module (MSIM) assistance information regarding operation in a second mode for a second subscription for a second network, the MSIM assistance information including at least one of idle mode information for the second subscription for the second network or a cell identifier (ID) for the second subscription for the second network; and
schedule the lib based on the MSIM assistance information.

* * * * *